United States Patent [19]
Dulaney

[11] Patent Number: 5,741,559
[45] Date of Patent: Apr. 21, 1998

[54] LASER PEENING PROCESS AND APPARATUS

[75] Inventor: Jeff L. Dulaney, Dublin, Ohio

[73] Assignee: LSP Technologies, Inc., Dublin, Ohio

[21] Appl. No.: 547,012

[22] Filed: Oct. 23, 1995

[51] Int. Cl.⁶ ........................... B05D 3/00
[52] U.S. Cl. ............... 427/554; 118/695; 156/350; 156/390; 427/156; 427/270; 427/273; 427/287; 427/300; 427/327; 427/348; 427/372.2; 427/402; 427/556; 427/596
[58] Field of Search ................ 427/554, 556, 427/596, 156, 270, 273, 287, 300, 327, 348, 372.2, 402; 118/695; 156/350, 390

[56] References Cited

U.S. PATENT DOCUMENTS

| | | | |
|---|---|---|---|
| 3,850,698 | 11/1974 | Mallozzi et al. | 148/4 |
| 4,401,477 | 8/1983 | Clauer et al. | 148/4 |
| 4,937,421 | 6/1990 | Ortiz, Jr. et al. | 219/121.68 |
| 5,075,893 | 12/1991 | Epstein et al. | 372/108 |
| 5,127,019 | 6/1992 | Epstein et al. | 372/108 |
| 5,131,957 | 7/1992 | Epstein et al. | 148/565 |
| 5,147,680 | 9/1992 | Slysa | 427/348 |
| 5,222,073 | 6/1993 | Epstein et al. | 372/34 |
| 5,360,641 | 11/1994 | Tu | 427/348 |

FOREIGN PATENT DOCUMENTS 0 319 397  11/1988  European Pat. Off. ........ C21D 10/00

*Primary Examiner*—Bernard Fianalto
*Attorney, Agent, or Firm*—Randall J. Knuth

[57] ABSTRACT

The invention relates to a method and apparatus for improving properties of a solid material by providing shock waves therethrough. Laser shock processing is used to provide the shock waves. The method includes applying a water based coating to a portion of the surface of the solid material and then applying a transparent overlay to the coated portion of the solid material. A pulse of coherent laser energy is directed to the coated portion of the solid material to create a shock wave. A high speed jet of fluid is directed to coated portion of the solid material at times to remove the coating from the solid material. Additionally, the method may include directing a high speed jet of fluid to the surface of the solid material to dry the solid material.

37 Claims, 2 Drawing Sheets

LASER PEENING PROCESS AND APPARATUS

BACKGROUND OF THE INVENTION

1. Field of the Invention

The present invention relates to the use of coherent energy pulses, as from high power pulsed lasers, in the shock processing of solid materials, and, more particularly, to methods and apparatus for improving properties of solid materials by providing shock waves therein. The invention is especially useful for enhancing or creating desired physical properties such as hardness, strength, and fatigue strength.

2. Description of the Related Art

Old methods for the shock processing of solid materials typically involve the use of high explosive materials in contact with the solid, high explosive materials or high pressure gases used to accelerate a plate that strikes the solid to produce shock waves therein. Such methods have several disadvantages. For example: (a) it is difficult and costly to shock process non-planar surfaces and complicated geometries, (b) storage and handling of the high explosive materials and high pressure gases pose a hazard, (c) the processes are difficult to automate and thus fail to meet some industrial needs and (d) high explosive materials and high pressure gases cannot be used in extreme environments such as high temperatures and high vacuum.

Shot peening is another widely known and accepted process for improving the fatigue, hardness, and corrosion resistance properties of materials by impact treatment of their surfaces. In shot peening, many small shot or beads are thrown at high speed against the surface of a material. The shot or beads sometimes escape from the treatment equipment and scatter in the surrounding area. Since the shot or beads might get into surrounding machinery and cause damage, shot peening usually cannot be used in a manufacturing line. Ordinarily such shot peening cannot be used on machined surfaces without a high likelihood of damaging them. In addition, shot peening has problems maintaining consistency of treatment caused by inherent wear of the shot by the shot peening equipment.

Laser shock processing equipment, however, can be incorporated into manufacturing lines without danger to surrounding equipment. Shock processing with coherent radiation has several advantages over what has been done before. For example, the source of the radiation is highly controllable and reproducible. The radiation is easily focused on preselected surface areas and the operating mode is easily changed. This allows flexibility in the desired shocking pressure and careful control over the workpiece area to be shocked. Workpieces immersed in hostile environments, such as high temperature and high vacuum can be shock processed. Additionally, it is easy to shock the workpiece repetitively. This is desirable where it is possible to enhance material properties in a stepwise fashion. Shocking the workpiece several times at low pressures can avoid gross deformation, cracking, and spallation of the workpiece while nonplanar workpieces can be shock processed without the need of elaborate and costly shock focusing schemes.

Laser Peening (hereinafter referred to as laser shock processing) utilizes two overlays: a transparent overlay (usually water) and an opaque overlay, previously an oil based or acrylic based black paint. During processing, a laser beam is directed to pass through the water overlay and is absorbed by the black paint, causing a rapid vaporization of the paint surface and the generation of a high-amplitude shock wave. The shock wave cold works the surface of the part and creates compressive residual stresses, which provide an increase in fatigue properties of the part. A workpiece is typically processed by processing a matrix of overlapping spots that cover the fatigue critical zone of the part.

The current laser processing of workpieces requires multiple painting cycles which require that the workpiece be manually removed from the laser processing station and repainted after several non-adjacent spots have been processed. Sometimes the old paint is removed before repainting and sometimes additional paint is simply added over the old paint. The repainting can require upwards of 12 to 15 paint cycles. Each cycle usually requires 15–20 minutes before the part can be returned to the processing station. This additional handling of the part for repainting will add as much as 50% to the cost of the processing in a production environment. What is needed in the art is a laser shock process that is more efficient, less wasteful and highly repeatable.

SUMMARY OF THE INVENTION

The present invention provides a method of laser shock processing that can be used in a production environment that significantly reduces processing time. The method includes the steps of painting the workpiece to be laser shock processed with a layer of water based paint applied to a small area about 2 to 3 times the diameter of the laser beam. A transparent overlay, such as water, is applied forming a thin flowing layer over the previously painted portion. When the water has totally covered the painted portion, the laser is fired directly through the flowing water overlay and onto the painted area. The water overlay pressure is then rapidly increased to form a high-speed water jet to quickly remove any remaining paint on the workpiece. After a preprogrammed time, the water overlay is shut-off. After the water is shut-off, the workpiece surface is dried by the use of a high-pressure fluid or gas jet which is controlled by an electronically controlled solenoid. The entire sequence and event timing is controlled by a preprogrammed microprocessor such as found in a personal computer. The sequences are repeated for each spot to be processed along the workpiece surface.

The invention comprises, in one form thereof, a method of improving properties of a solid material by providing shock waves therein. An energy absorbing coating is applied to a portion of the surface of the solid material. A transparent overlay material is then applied to the coated portion of the solid material. A pulse of coherent energy is then directed to the coated portion of the solid material to create a shock wave. A high speed jet of a first fluid is directed to the surface of the solid material to dry the solid material.

The invention comprises, in another form thereof, a method of improving properties of a solid material by providing shock waves therein. A water based paint is applied to a portion of the surface of the solid material. A transparent overlay material is then applied to the coated portion of the solid material. A pulse of coherent energy is then directed to the coated portion of the solid material to create a shock wave.

The invention comprises, in another form thereof, a method of improving properties of a solid material by providing shock waves therein. A water based coating is applied to a portion of the surface of the solid material. A transparent water overlay is then applied to the coated portion of the solid material. A pulse of coherent energy is then directed to the coated portion of the solid material to create a shock wave. A high speed jet of a first fluid is directed to the surface of the solid material to remove the coating from the solid material. A high speed jet of a second fluid is directed to the surface of the solid material to dry the solid material.

The invention comprises, in yet another form thereof, an apparatus for improving properties of a workpiece by providing shock waves therein. The apparatus includes a material applicator for applying an energy absorbing material on to the workpiece to create a coated portion and a transparent overlay applicator for applying a liquid transparent overlay to the workpiece over said coated portion. A laser is operatively associated with the transparent overlay applicator to provide a laser beam through the liquid transparent overlay to create a shock wave on the workpiece. A positioning mechanism is included to selectively position the workpiece relative to the material applicator, the transparent overlay applicator and the laser. Conversely, the positioning mechanism may position the material applicator and transparent overlay applicator correctly over the spot on the workpiece to be treated while it is in position in the laser beam path. A control unit is operatively associated with each of the applicators, laser, and positioning mechanism, to control the operation and timing of each of the applicators, laser, and the selective operation of the positioning mechanism.

An advantage of the present invention is that the method allows the use of water-based paints. Prior laser painting processes utilized oil based or acrylic based paints because of the long duration of the immersion of the workpiece in the transparent overlay (i.e., water). This long duration soaking would have removed a water-based paint.

Another advantage of the present invention is that the workpiece is now dried in an efficient manner by use of a high speed gas of fluid jet. The jet drying of the processed portion of the workpiece is now situated for another cycle of the process without removal from the processing station.

Yet another advantage of the present invention is that it reduces or eliminates masking of the workpiece. Prior painting of the workpieces often required spray painting with use of a mask. Masks were used to keep the paint out of critical areas on the workpiece and reduce the amount of paint stripping needed afterwards. The present invention, by painting only the workpiece portions to be laser shock processed, creates significant savings in labor, solvents, and wasted paint.

A further advantage of the present invention is the utilization of a flowing, transparent water overlay for both processing and cleaning of the workpiece surface. The use of the flowing water covers the painted area uniformly while additionally ensuring that any heat possibly transferred to the workpiece by the process will be removed. Additionally, by use of the flowing transparent overlay, it is easy to control and increase the pressure of the water flow to that required to remove the water-based paint after laser processing. This function reduces cleaning time and eliminates the use of an additional paint solvent.

Yet a further advantage of the present invention is that the process eliminates the need to move the workpiece from workstation to workstation as was previously accomplished and necessitated. The laser shock processing system now can be adapted to manufacturing process workloads and requirements.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
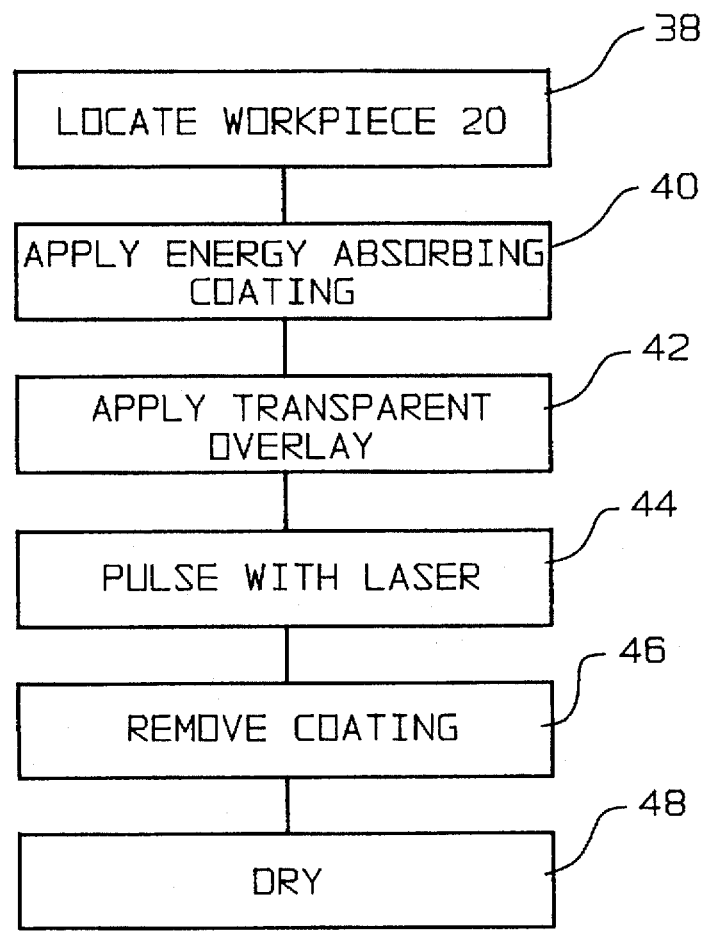
FIG. 1 is a flow chart of the method of the present invention.

The improvements in fatigue life produced by laser shock processing are the results of residual compressive stresses developed in the irradiated surface retarding fatigue crack initiation and/or slowing the crack propagation rate. A crack front is the leading edge of a crack as it propagates through a solid material. Changes in the shape of a crack front and slowing of the crack growth rate when the crack front encounters the laser shock zone in a laser shock processing condition have been shown. Laser shock processing is an effective method of increasing fatigue life in metals by treating fatigue critical regions. As to what effect the tensile residual stresses surrounding the laser shocked region would have on crack initiation, a previous study is described in "Shock Waves and High Strained Rate Phenomena in Metals" by A. H. Clauer, J. H. Holbrook and B. P. Fairand, ed. by M. S. Meyers and L. E. Murr, Plenum Press, New York (1981), pp. 675–702. Described in the above reference are the effects of laser shock processing on fatigue of welded aluminum specimens that had used a series of overlapping spots to cover the weld and heat-affected zones. Significant increases in fatigue life were observed for these specimens indicating that overlapping the spots did not significantly reduce the effects of laser shocking. This is supported by results on a low carbon steel that showed no change in the compressive residual stress profile across the edge of a spot in a spot-overlap region.

For a more thorough background in the prior history of laser shock processing and that of high power processing of engineered materials, reference can be made to U.S. Pat. No. 5,131,957, such patent explicitly hereby incorporated by reference. This patent also shows a type of laser and laser circuit adaptable for use with the present invention. Another type of laser adaptable for use with the invention is that of a ND:Glass Laser manufactured by LSP Technologies of Dublin, Ohio.

Overlays are applied to the surface of the target workpiece being laser shock processed. These overlay materials may be of two types, one transparent to laser radiation and the other opaque to laser radiation. They may be used either alone or in combination with each other, but it is preferred that they be used in combination with the opaque overlay adjacent the workpiece, and the outer transparent overlay being adjacent the opaque overlay.

The transparent overlay material should be substantially transparent to the radiation. Useful transparent overlay materials include water, water-based solutions, other noncorrosive liquids, glass, quartz, sodium silicate, fused silica, potassium chloride, sodium chloride, polyethylene, fluoroplastics, nitrocellulose, and mixtures thereof. Fluoroplastics, as they are known by ASTM nomenclature, are parallinic hydrocarbon polymers in which all or part of each hydrogen atom has been replaced with a fluorine atom. Another halogen, chlorine, can also be part of the structure of a fluoroplastic. By order of decreasing fluorine substitution and increasing processability, these materials include polytetrafluoroethylene (PTFE); fluorinated ethylenepropylene (FEP); the chlorotrifluorethylenes (CTFE); and polyvinylidine fluoride ($PVF_2$). Also available is a variety of copolymers of both halogenated and fluorinated hydrocarbons, including fluorinated elastomers. Additionally, the transparent overlay could be a gel or a strip of tape comprised of one or more of the above materials.

Where desired, the opaque overlay material may be substantially opaque to the radiation. Useful opaque overlay materials include black paint, pentacrythritol tetranitrate (PETN); bismuth, lead, cadmium, tin, zinc, graphite; and mixtures of charcoal or carbon black with various transparent materials such as mixtures of nitrocellulose and potassium perchlorate or potassium nitrate. Optionally, a layer of another solid overlay material may be attached to the layer of substantially opaque material. The outer solid layer may be either transparent or opaque. The term "transparent" in this application is defined as meaning pervious to the laser beam utilized, not automatically or necessarily pervious to visible light. A typical overlay is about 10 to 20,000 micrometers (μm) thick. In the preferred embodiment of the invention, water based black paint is used to give superior results both in terms of energy absorption and removability after shock processing.

Figure 2:
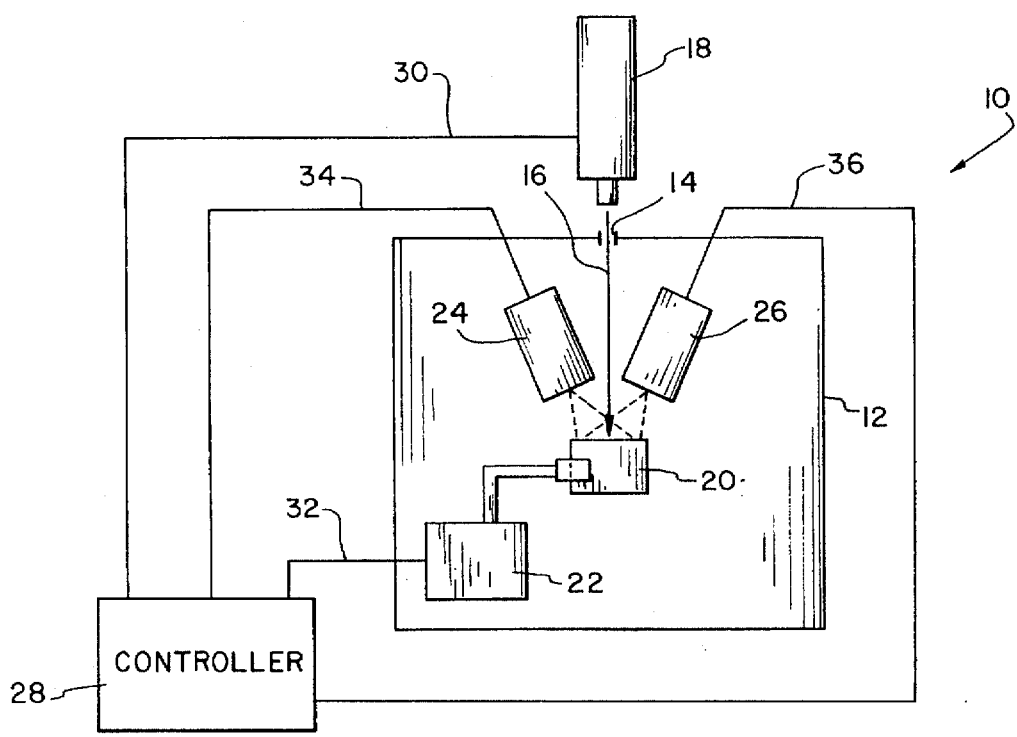
FIG. 2 is a diagrammatic view of one embodiment of the present invention.

Referring now to the drawings and particularly to FIG. 2, there is shown a preferred embodiment 10 of the present invention including a target chamber 12 in which the laser shock process takes place. The target chamber 12 includes an opening 14 for a laser beam 16 created by laser 18, a source of coherent energy. Laser 18, by way of example, may be a commercially available high power pulse laser system capable of delivering more than approximately 40 joules in 5 to 100 nanoseconds. The laser pulse length and focus of the laser beam may be adjusted as known in the art. Shown in FIG. 2, a workpiece 20 is held in position within target chamber 12 by means of a positioning mechanism 22. Positioning mechanism 22 may be of the type of a robotically controlled arm or other apparatus to precisely position workpiece 20 relative to the operational elements of laser shock system 10.

System 10 includes a material applicator 24 for applying an energy absorbing material onto workpiece 20 to create a coated portion. Material applicator 24 may be that of a solenoid operated painting station or other construction such as a jet spray or aerosol unit to provide a small coated area onto workpiece 20. The material utilized by material applicator 24 is an energy absorbing material, preferably that of a black, water-based paint such as 1000 F AQUATEMP (TM) from Zynolite Product Company of Carson, Calif.. Another opaque coating that may be utilized it that of ANTI-BOND, a water soluable gum solution including graphite and glycerol from Metco Company, a Division of Perkin-Elmer of Westbury, N.Y.. Alternatively, other types of opaque coatings may be used such as those discussed above.

System 10 further includes a transparent overlay applicator 26 that applies a fluid or liquid transparent overlay to workpiece 10 over the portion coated by material applicator 24. Transparent overlay material should be substantially transparent to the radiation as discussed above, water being the preferred overlay material.

As shown in FIG. 2, both material applicator 24 and transparent overlay material applicator 26 are shown directly located within target chamber 12. In a production operation environment, only the necessary operative portions need be located through and within target chamber 12 such as the portion through which the materials actually flow through a flow head. The supply tanks for the transparent overlay materials and other energy absorbing materials may be located outside of target chamber 12.

A control unit, such as controller 28 is operatively associated with each of the material applicator 24, transparent overlay material applicator 26, laser 18 and positioning mechanism 22. Controller 28 controls the operation and timing of each of the applicators 24, 26, laser 18 and selective operation of positioning mechanism 22 to ensure proper sequence and timing of system 10. Shown in FIG. 2, controller 28 is connected to laser 18, positioning mechanism 22, material applicator 24 and transparent overlay material applicator 26 via control lines 30, 32, 34 and 36, respectively. Controller 28, in one embodiment, may be a programmed personal computer or microprocessor.

In operation, controller 28 controls operation of system 10 once initiated. As shown in FIG. 1, the method of the invention is that first, workpiece 20 is located (38) particularly within targeting chamber 12 by positioning mechanism 22. Controller 28 activates material applicator 24 to apply a laser energy absorbing coating (40) such as a water-based black paint onto a particular location of workpiece 20 to be laser shock processed. The next step of the process is that controller 28 causes transparent overlay material applicator 26 to apply transparent overlay (42) to the previously coated portion of workpiece 20. At this point, laser 18 is immediately fired by controller 28 to initiate a laser beam 28 to impact the coated portion (44). Preferably the time between applying the transparent water overlay and the step of directing the laser energy pulse is approximately 0.1 to 3.0 seconds. By directing this pulse of coherent energy to the coated portion, a shock wave is created. As the plasma expands from the impact area, it creates a compressional shock wave passing through and against workpiece 20.

The above-described process or portions of the process are repeated to shock process the desired surface area of workpiece 20. Depending upon the energy levels and the amount of laser shocking desired on workpiece 20, controller 28 may position or re-index workpiece 20 into another position using positioning mechanism 22 so that system 10 may apply coatings to and laser beam 12 may impact a different portion which may overlap the previously impact area.

Figure 3:
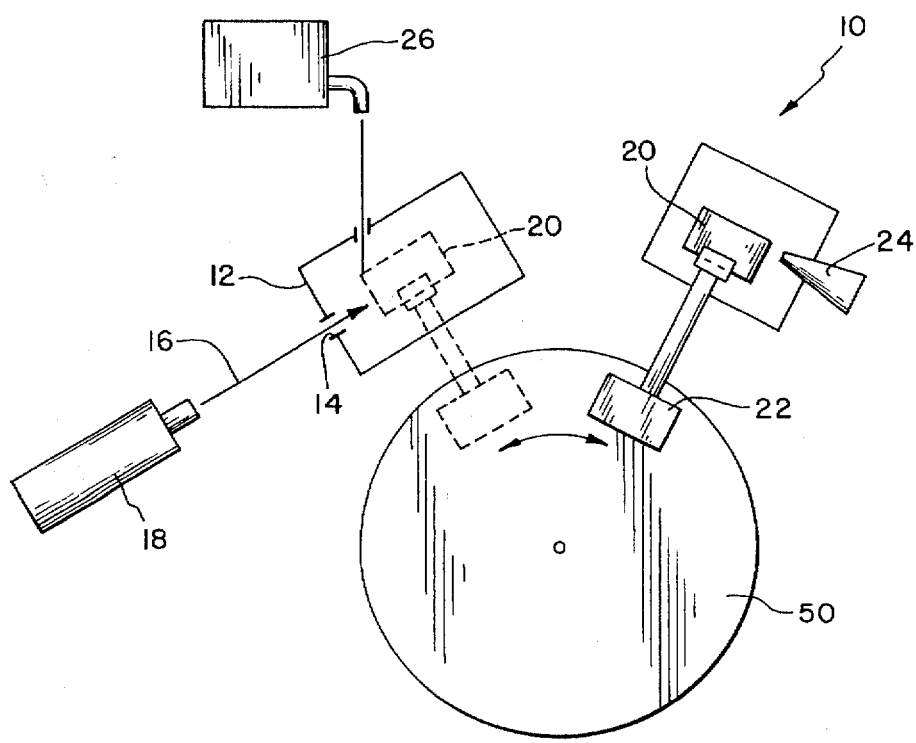
FIG. 3 is a diagrammatic view of another form of the present invention utilizing a rotatable carousel to index a workpiece.

It may be advantageous in a production environment to separate the coating operation from the lasing operation. FIG. 3 discloses another way to reposition and re-index a workpiece 20 using a selectively rotatable carousel 50. Positioning mechanism 22 is located on carousel 50 for rotation therewith. Controller 28 will control both the operation of positioning mechanism 22 and the location of the mechanism by selectively rotating carousel 50 to position a workpiece adjacent either material applicator 24 or transparent overlay material applicator 26. If necessary additional workstations may be utilized, but these will reduce the process efficiency.

Depending upon the particular aspects of the energy absorbing water-based paint utilized, it may be necessary to remove such paint between such lasing steps 44. This additional step is referred as 46 of FIG. 1. The method may be accomplished by a high speed jet or application of liquid to forcibly remove the coating from workpiece 20.

One way for removing the coating could be utilization of the same transparent overlay material applicator 26 used before. A high pressure jet of the transparent overlay material, such as water, controlled by a solenoid valve (not shown) connected to controller 28 may be utilized to jet wash a particular portion previously coated by material applicator 24. This transparent overlay material applicator 26 would operate in at least two different pressure modes, one to apply the transparent overlay material to the workpiece without removing the energy absorbing coating, and the other pressure mode to apply transparent overlay material to the workpiece to remove the energy absorbing coating.

Additionally to the basic method of operation, it may be necessary to dry workpiece 20 between laser shocking (step 44) and the application of the energy absorbing coating step 40 as seen by step 48 in FIG. 1. Another similar type of material applicator may be utilized to blow a stream of compressed fluid, gas, or air onto workpiece 20 to thereby dry the workpiece. Additionally, would be advantagous to warm or heat the compressed fluid or gas to accelerate the drying process.

In one form of the invention, it may be possible to incorporate such compressed air or liquid with material applicator 24 or 26 such that all the steps of the process shown in FIG. 1 may be accomplished without moving the workpiece 20. Workpiece 20 may be indexed if necessary to cover large areas by the process. By not moving workpiece 20, additional manufacturing efficiencies are produced while additionally reducing the time between steps. The limiting factor in the process currently is the cycle time of laser 18. Laser 18 may be fired about every 0.5 seconds to 10 seconds. This minimum amount of time is required by laser 18 to recharge while permitting selected other steps of the process shown in FIG. 1 to be accomplished.

In alternative embodiments, the application of transparent overlay material (shown in step 42) may comprise of applying the transparent overlay material continuously before and during the directing of the laser energy pulse.

Depending upon the workpiece material, many parameters of the present invention may be selected to control the shock process. For example, the operator controller may select a particular laser pulse energy, laser pulse time, number of laser pulses, focal lens, working distance, thickness of both the energy absorbing coating and transparent overlay to control the laser shock process. More particularly, laser pulse energy and laser pulse width directly affect this cycle. The amount of energy placed on the surface of the workpiece and number of laser pulses affects the depth of each shock and the speed of the shocking process. It has been found that the energy of the laser pulse, as well as other parameters should be controlled in order to prevent surface melting of the workpiece.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of improving properties of a solid material by providing shock waves therein, comprising:

applying an energy absorbing coating to a portion of the surface of the solid material;

applying a transparent overlay material to said coated portion of the solid material;

directing a pulse of coherent energy to said coated portion of the solid material to create a shock wave; and directing a high-speed jet of a first fluid to the surface of the solid material to clean a portion of said surface of the solid material of possible energy absorbing coating and transparent overlay material to prepare said surface for another cycle.

2. The method of claim 1 in which said method is repeated to another portion of the surface of the solid material.

3. The method of claim 1 in which said step of applying an energy absorbing coating comprises applying a water based paint.

4. The method of claim 1 in which said step of applying a transparent overlay comprises applying a layer of water to said coated portion.

5. The method of claim 1 in which said step of applying a transparent overlay material comprises applying a coat of liquid to said coated portion.

6. The method of claim 1 in which said step of applying a transparent overlay material comprises continuously applying said overlay before and during said directing of said energy pulse.

7. The method of claim 6 in which said step of applying a transparent overlay comprises applying a coat of water to said coated portion.

8. The method of claim 1 further comprising the step of directing a high speed jet of a second fluid to said coated portion of the solid material to substantially remove said coating from the solid material.

9. The method of claim 8 in which said second fluid consists essentially of said transparent overlay material.

10. The method of claim 8 in which said step of directing a high speed jet of a second fluid occurs immediately after said step of directing the pulse of coherent energy.

11. The method of claim 1 in which said first fluid consists essentially of compressed gas.

12. The method of claim 1 in which a laser provides the coherent radiation.

13. The method of claim 1 in which all of the steps are timed and controlled by an electronic microprocessor.

14. The method of claim 1 in which the process is repeated about every 0.5 to 10.0 seconds.

15. A method of improving properties of a solid material by providing shock waves therein, comprising:

applying a water based paint to a portion of the surface of the solid material;

continuously applying a transparent overlay material to said coated portion of the solid material both before and during the next step; and directing a pulse of coherent energy to said coated portion of the solid material to create a shock wave.

16. The method of claim 15 in which said step of applying a transparent overlay comprises applying a coat of water to said coated portion.

17. The method of claim 15 in which the process is repeated about every 0.5 to 10.0 seconds.

18. The method of claim 15 in which said step of directing of said energy pulse is accomplished before said transparent overlay material substantially erodes said water based paint.

19. The method of claim 15 further comprising the step of directing a high speed jet of a fluid to the solid material to substantially dry from the solid material.

20. The method of claim 15 further comprising the step of directing a high speed jet of a fluid to said coated portion of the solid material to substantially remove said coating from the solid material.

21. The method of claim 20 in which said fluid consists essentially of said transparent overlay material.

22. The method of claim 21 in which said fluid consists essentially of water.

23. A method of improving properties of a solid material by providing shock waves therein, comprising:

applying a water based coating to a portion of the surface of the solid material;

applying a transparent water overlay to said coated portion of the solid material;

directing a pulse of laser energy to said coated portion of the solid material to create a shock wave;

directing a high speed jet of a first fluid to said coated portion of the solid material to substantially remove said coating from the solid material; and directing a high speed jet of a second fluid to the surface of the solid material to dry the solid material.

24. The method of claim 23 in which the time between the step of applying the transparent water overlay and the step of directing the laser energy pulse is about 0.1 to 3.0 seconds.

25. The method of claim 23 in which said step of applying a transparent overlay material comprises continuously applying said overlay before and during said directing of said energy pulse.

26. The method of claim 23 in which said first fluid consists essentially of water.

27. The method of claim 23 in which said first fluid consists essentially of water utilized in said step of applying said transparent water overlay.

28. The method of claim 23 in which said second fluid consists essentially of compressed fluid.

29. An apparatus for improving properties of a workpiece by providing shock waves therein, comprising:

a material applicator for applying an energy absorbing material onto the workpiece to create a coated portion;

a transparent overlay applicator for applying a transparent overlay to the workpiece over said coated portion;

a laser operatively associated with said transparent overlay applicator to provide a laser beam through the liquid transparent overlay to create a shock wave on the workpiece;

a positioning mechanism to selectively position the workpiece relative to said material applicator, said transparent overlay applicator and said laser; and a control unit operatively associated with each of said applicator, said laser, and said positioning mechanism, to control the operation and timing of each said applicator and said laser and the selective operation of said positioning mechanism.

30. The apparatus of claim 29 further in which said positioning mechanism indexes the workpiece so that the process cycle occures on another location of the workpiece.

31. The apparatus of claim 29 in which said control unit is a programmable personal computer.

32. The apparatus of claim 29 in which said transparent overlay applicator can be operated to apply in at least two different pressure modes, one said pressure mode to apply a liquid transparent overlay to the workpiece without removing the energy absorbing coating and the other pressure mode to apply liquid transparent overlay to the workpiece to remove the energy absorbing coating from the workpiece.

33. The apparatus of claim 29 in which said material applicator additionally applies a fluid onto the workpiece to dry the workpiece.

34. The apparatus of claim 29 further comprising a fluid applicator operatively associated with said control unit for applying a fluid to the workpiece to dry the workpiece.

35. The apparatus of claim 29 in which said positioning mechanism is a selectively rotatable carousel.

36. The apparatus of claim 29 in which said positioning mechanism indexes the workpiece between said applicators.

37. The apparatus of claim 29 further comprising a target chamber, portions of said applicators and said positioning mechanism located within said target chamber to operatively engage the workpiece.

* * * * *